United States Patent [19]

Brinser

[11] Patent Number: 5,411,835

[45] Date of Patent: May 2, 1995

[54] DRY PHOTOCHROMATIC FILM

[76] Inventor: Steven L. Brinser, 6184 Greenbriar La., Fayetteville, Pa. 17222-9678

[21] Appl. No.: 158,789

[22] Filed: Dec. 1, 1993

[51] Int. Cl.$^6$ .............................................. G03C 1/73
[52] U.S. Cl. .................................... 430/138; 430/962; 430/338; 503/215; 250/474.1; 250/482.1
[58] Field of Search ..................... 430/138, 338, 962; 503/215; 250/474.1, 482.1

[56] References Cited

U.S. PATENT DOCUMENTS

| | | | |
|---|---|---|---|
| 3,743,846 | 7/1973 | Matsumoto et al. | 250/474.1 |
| 4,788,126 | 11/1988 | Feldman et al. | 430/138 |
| 4,918,317 | 4/1990 | Hess et al. | 250/474.1 |
| 5,206,118 | 4/1993 | Sidney et al. | 430/343 |
| 5,296,275 | 3/1994 | Goman et al. | 428/29 |

FOREIGN PATENT DOCUMENTS 2-259587  10/1990  Japan ................. 250/474.1

Primary Examiner—Charles L. Bowers, Jr.
Assistant Examiner—John A. McPherson
Attorney, Agent, or Firm—Charles S. Knothe

[57] ABSTRACT

The photochromatic indicator is a dry film comprised of microencapsulated chemistry which reacts to the degradation of the dry film components when irradiated by UVA and UVB in the frequency spectral range of 290 nm (low end of the UVB spectrum) to 365 nm (high end of the UVA spectrum). This degradation produces free hydrogen and chorine radicals which combine to form acidic byproducts of hydrogen chloride gas or hydrochloric acid.

The initial microencapsulation has an interior molecular grouping of acid sensitive dye and UVA and UVB absorbing chemistry surrounded by, and bonded to, a chlorinated rubber compound. This interior is then also microencapsulated by bonding a coating of polyvinylchloride (pvc) to the chlorinated rubber by using epoxide agents which, in turn, retard the degradation of both the pvc and the chlorinated rubber.

By varying the amount of epoxides in the bonding phase, the time for the dye to complete its full color change can be adjusted. The degradation is directly proportional to the cumulative amount of exposure to UVA and UVB, and is timed to a selected time interval for a full color change of the dye.

4 Claims, 1 Drawing Sheet

DRY PHOTOCHROMATIC FILM

The present invention is directed to a patch, designed to be worn on the skin or clothing of an individual taking medication or using over-the-counter products that could cause a phototoxic, photoallergic, or photophobic reaction if they are exposed to harmful levels of UVA and UVB radiation contained in sunlight. The patch would provide a visible signal to the user that they have reached their maximum exposure levels of UVA and UVB for that day and they should avoid direct sunlight for the remainder of that day.

The current art is this area includes the following patents:

U.S. Pat. No. 3,787,687 (Trumble) discloses a dosimeter comprising a base, a polymeric film containing a 1,3-,3-trimethylindolinobenzopyrylospiran positioned on a portion of the base, a filter positioned on the polymeric film and a color chart consisting of many pieces of colored transparent film adjacent the polymeric film.

U.S. Pat. No. 3,903,423 (Zweig) discloses a radiation dosimeter with a frequency response of 290 to 320 nm using a filter factor (the opaqueness of the plastic) and a dosimeter compound.

U.S. Pat. No. 3,924,135 (Dhar etal.) discloses a direct response dosimeter using magnesium oxide thermolumineecent crystals.

U.S. Pat. No. 4,130,760 (Fanselow et al.) discloses an integrating, reusable device comprising a substrate having deposited thereon at least one photochromatic aziridine compound which is sealed in an oxygen barrier of polyvinyl alcohol, along with a spectral response shaping filter to transmit only actinic radiation.

U.S. Pat. No. 4,308,459 (Williams) discloses a continuous colorchange dosimeter in which a mixture of polyvinychloride latex and multiple acid sensitive dyes is deposited on a paper substrate and dried to form a film.

U.S. Pat. No. 4,763,011 (Smith) discloses a meter comprised of a sealed silica tube, devoid of oxygen, containing a dialkye disulphide disolved in a methylcyclopentane and a UV filter which gives a wavelength response which matches the erythemal action spectrum of the skin.

U.S. Pat. No. 4,935,631 (Mosley et al.) discloses a radiation meter with internal reflective construction in which is found a flourescent material and a photodiode.

U.S. Pat. No. 5,028,792 (Mullis) discloses a dosimeter comprised of a film substantially impermeable to oxygen with an ultraviolet transparent moisture barrier adhered to and surrounding said film. The film is a mixture of polyvinyl alcohol, water, acid-sensitive dye, a surfactant and a photoacid progenitor comprising a bisulfite adduct of an ortho nitro-substituted aromatic aidehyde.

U.S. Pat. No. 5,075,557 (Harasawa et al.) discloses an apparatus utilizing phycocyanin or allophycocyan, a phycobilin series dye or a dye extracted from algae as the colored material which discolors when exposed to ultraviolet radiation.

U.S. Pat. No. 5,206,118 (Sidney et al.) discloses a color-change dosimeter film made of a halogen-containing polymer comprising a substantially colorless acid-sensitive leuco dye (carbazolylmethane, bisindophthalide, fluoran or mixtures thereof) dispersed in an organosol film of halogen-containing polymer particles fused in a plasticizer, with a protective clear coat on at least one surface of the film.

UK Patent Application GB 2,067,060 which was published Jul. 15, 1981 discloses a photosensitive element comprised of a cast polysulphone film.

Japanese Patent No. 2-259587 discloses a device with microcapsules containing a compound which becomes liquid and oozes out of its capsule upon exposure to radiation energy, contacting a second compound to produce a color change.

While there are many individual differences between the present invention and those listed above, the two major and overriding differences are that no filter is required for timing or frequency response in the present invention and it is a two-component microencapsulated dry film.

The harmful UVA/UVB spectrum lies between 290 and 365 nanometers (nm). The UV spectrum is subdivided into three bands: UVA (330-365 nm), UVB (290-330 run) and UVC (230-290 nm). The amount of UVA and UVB present at the earth's surface depends upon a number of factors, including the latitude, elevation above sea level, the time of day, the time of year and atmospheric conditions, including in particular the thickness of the ozone layer in the upper atmosphere. UVA is present during daylight hours all year round and therefore is harder to avoid than UVB, which is most prevalent in the summer and during the middle of the day, from approximately 10:30 a.m. to 2:30 p.m. UVC from sunlight does not reach the earth's surface.

It has been shown in studies such as (Food and Drug Administration: *Sunscreen drug products for over-the-counter human use.* Federal Register, 1978; 43:38206-69), (Kays Kaidbey, M.D. and R. William Gange, M.D.: *Comparison of methods for assessing photoprotection against ultraviolet A in vivo,* Journal of the American Academy of Dermatology, 1978; 16:346-353) and (Frederick Urbach: *Biological Responses to Ultraviolet A Radiation.* Valdenmar Publishing Company, 1992) that the relationship between UVB and UVA is such that in twenty minutes an average person can receive enough UVB energy to begin to turn the individual's skin perceptively pink, which pinkness lasts beyond a 24 hour period. This is known as one (1) Minimal Erythema Dose (MED). It is sufficient that these studies also show that over the same time period of twenty minutes 1,000 MED's of UVA will strike the same individual causing a much less skin color change, but a sufficient enzymatic blood chemistry change.

These enzyme changes in the blood, along with the presence of certain prescription and over-the-counter preparations, including a wide variety of antibiotics, antidepressants, birth control pills, blood pressure medications, etc. which can be applied to the skin as creams or ointments, are taken orally or by injection, or by the use of prescription inhalers (see *Medications That Increase Sensitivity to Light: A* 1990 *Listing* published by the U.S. Department of Health and Human Services, FDA 91-8280, 1990), trigger a photosensitive reaction causing rash, blister, nausea, fainting, dizziness, eye burns and even shock and/or coma. Importantly, a particular medication will not cause the same degree of skin reaction in all individuals, and an individual who experiences no reaction with one MED of exposure on one occasion will not necessarily avoid a photosensitive reaction while taking the same medication and dosage at another time.

Drug phototoxicity is an adverse response in skin tissue, blood chemistry and occasionally in ocular structures, to a combination of a drug and the appropriate wavelengths of UV, typically UVA (330–365 nm), although the absorption spectra of the agents extend somewhat into the high range of UVB (290–330 nm). In phototoxic reactions, the drug absorbs energy from UVA light and releases it into the skin and blood system causing cellular damage and the production of harmful enzymes in the blood system.

The occurrence of this enzymatic phototoxic change can be dangerous to the extent of being life threatening. The onset is rapid, with urticaria occurring within two to six hours of sun exposure, followed by erythema and tenderness at 24 hours, and resolution in two to four days. Bullae or vesicles may be present in severe reactions. Hyperpigmentation may occur as a residual effect of a phototoxic reaction.

Photoallergy is somewhat less dangerous and is an immune-mediated reaction in which light may cause a structural change in a drug so that it acts as a hapten, possibly by binding to proteins in the skin. Once an antigen is formed (hapten-protein complex), Langerhans' cells residing in the epidermis can present the antigen to immunocompetent cells, causing hypersensitivity. Photoallergy occurs rarely, compared with phototoxicity.

Drug-induced photoallergy develops after a few hours of continuous exposure, analogous to contact dermatitis. A reaction can even occur within 24–48 hours of re-exposure to the drug and light. The reaction is usually pruritic and eczematous, but it can manifest as papules or plaques.

Current methods of determining if a drug (prescription medication or over-the-counter product) is photosensitizing your body are either to experiment with the drug or submit to a Photopatch test or an M.E.D. test. These diagnostic tests are time consuming and expensive.

Common photosensitizing drugs and substances include: citrus fruit juices and oils, antidepressants, Parkinson's disease medication, diabetis medication, many antibiotics and antimicrobials, many cancer treatment (chemotherapy) drugs, antihistamines, benzocaine, diuretics, hexachlorophene, nonsteroidal anti-inflammatory drugs, saccharine, and many common perfume and cosmetic ingredients.

Specific families of drugs which have been implicated in photoallergic and/or phototoxic reactions include the following: Amantadine, Amiodarone, Benzocaine, Benzodiazepines, Carbamazepine, Chloroquine, Clomipramine, Coal Tar, Corticosteroids, Dacarbazine, Dapsone, Diphenhyrramine, Fluorescein, Fluorouracil, Gold Salts, Griseofulvin, Methotrexate, Methyldopa, Phenothiazines, Piroxicam, Psoralens, Pyrazinamide, Pyrimethamine, Quinine, Quinidine, Quinolones, Retinoids, Sulfonamides, Sulfonylureas, Tetracyclines, Thiazide and Vinblastine.

A warning device such as that being claimed herein and timed as an early warning system, will give the wearer taking any of the aforementioned medications a warning that they are in danger of overexposure and they should get out of the sun.

SUMMARY OF INVENTION

This invention discloses a dry photochromatic film which degrades upon exposure to UV light into an acidic product, preferably hydrochloric acid, triggering a change in the color of the dye in the film. It has an interior molecular grouping of acid sensitive dye and UVA and UVB absorbing chemistry. The interior molecular grouping is surrounded by, and bonded to, a chlorinated rubber compound encapsulant. The interior microencapsulation is then coated with epoxides which has a second microencapsulation of pvc. The expoxide coating aids in the bonding of the outer pvc encapsulant and allows for the alteration of the time required to achieve a full color change of the dye.

An embodiment of this invention is a patch to alert the user that they have been exposed to UV light for a period of time such that they are approaching overexposure. In this embodiment the dry photochromatic film is applied a substrata. In a further embodiment wherein the dry photochromatic film is distributed on the substrata to display a message when exposed to UV light.

DETAILED DESCRIPTION OF THE INVENTION

Figure 1:
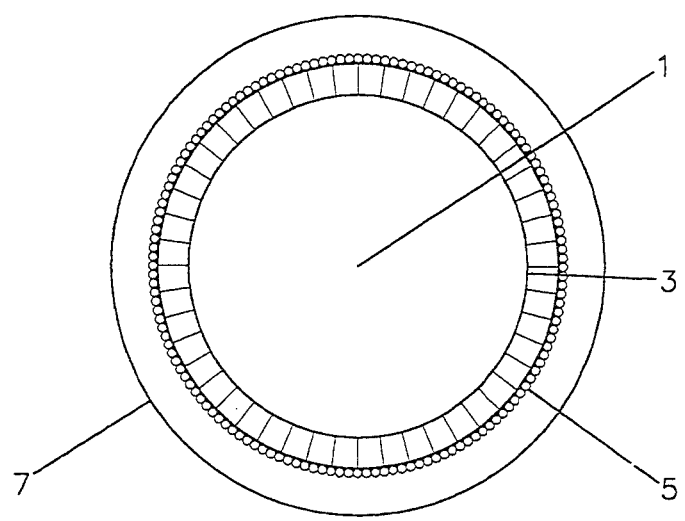
FIG. 1 is a diagram of the microencapsulated chemistry.

FIG. 1 illustrates the microencapsulated chemistry which reacts to the degradation of the components when irradiated by UVA and UVB in the frequency spectral range of 290 mm to 365 nm. The chemistry is totally microencapsulated by a protective layer of hypo-allergenic polymer 7 that prevents the user from coming in contact with the photo-chemicals.

The initial microencapsulation has an interior molecular grouping of acid sensitive dye and UVA and UVB absorbing chemistry 1 surrounded by, and bonded to, a chlorinated rubber compound 3. This interior is then also microencapsulated by bonding a coating of polyvinylchloride (pvc) 7 to the chlorinated rubber by using epoxide agents 5 which, in turn, retard the degradation of both the pvc and the chlorinated rubber.

When a sufficient amount of energy from the sun (called photoinitiators) strikes the surface of the dried film it will generate sufficient chemical change within the dried film so as to trigger the release of hydrogen and chlorine from one or more plastic or rubber compounds that degrade in this manner when exposed to UV radiation. This degradation produces free hydrogen (H) and chorine (Cl) radicals which combine to form acidic byproducts of hydrogen chloride gas or hydrochloric acid.

The continuously irradiated dry film components are now in a state of dynamic change with the production of the acidic compounds accelerating at an ever increasing rate. Having been driven toward a more acidic state, from a pH of 4.5 to a pH of 3.5, the acid sensitive dye [3-(4-dimethylamino-1-napthylazo)-4-methoxybenzenesulfonic acid] which is a yellow color at a pH of 4.5, will begin a color change as more HCl is produced by the degradation of the plastic and the rubber compounds. The lower the pH is driven, the deeper the color change becomes, from yellow to purple. At 3.5 pH the 3-(4-dimethylamino-1-napthylazo)-4-methoxybenzenesulfonic acid has completed its cycle and will change no more.

The timing of the full color change is set for a period of 1 MED, approximately twenty minutes, by varying the amount of epoxides in the bonding phase, assuming the film has received an average amount of sun on a mid-summer day in the central part of the United States between 12:00 noon and 12:20 P.M. While the warning requirement is most needed at 1 MED, time ranges from a few seconds to several weeks can be achieved with the use of epoxides in different amounts. Different colors can be achieved by using different dyes which change colors at different pH levels.

Figure 2:
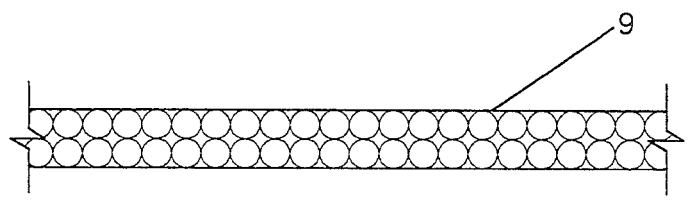
FIG. 2 is diagram of a film consisting of a plurality of microencapsulated chemistry.

FIG. 2 illustrates a film of the microencapsulated components 9 as shown in detail in FIG. 1.

Figure 3:
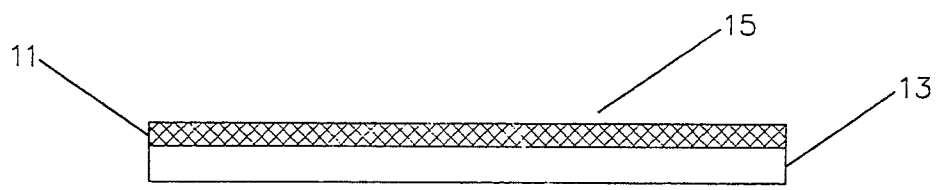
FIG. 3 is a diagram of a film of microencapsulated chemistry applied to a substrata.

FIG. 3 shows an embodiment of this film into a patch 15 in the form of a small disc with the ultraviolet (UV) photochromatic indicator. The patch is designed to be worn on the surface of clothing Or skin that most nearly faces the sun when one is outdoors. The film 11 is applied to the substrate 13.

I claim:

1. A dry color or colorless photochromatic film comprising microcapsules with components which chemically change upon exposure to ultraviolet light into acidic products, triggering a change in the color in the film, wherein said microcapsules comprise:

an interior molecular grouping which is a mixture of acid sensitive dye and ultraviolet-A and ultraviolet-B absorbing chemistry, said interior molecular grouping is surrounded by, and bonded to, a chlorinated rubber compound encapsulant, forming an interior microencapsulation, said interior microencapsulation is then coated with epoxides;

said interior microencapsulation with epoxide coating has a second microencapsulation of polyvinyl chloride, said expoxide coating aids in the bonding of the microencapsulation of polyvinyl chloride and allows for the alteration of the time required to achieve a full color change of the dye.

2. A patch to alert a user that they have been exposed to ultraviolet light for a period of time such that they are approaching overexposure, comprising:

a substrate the dry photochromatic film of claim 1 applied to the substrate.

3. The patch in claim 2 wherein the dry photochromatic film is distributed on the substrate to display a message when exposed to ultraviolet light.

4. The dry photochromic film of claim 1, wherein the acidic product is hydrochloric acid.

* * * * *